United States Patent [19]

Onodera et al.

[11] Patent Number: 5,640,544
[45] Date of Patent: Jun. 17, 1997

[54] COMPUTER NETWORK HAVING AN ASYNCHRONOUS DOCUMENT DATA MANAGEMENT SYSTEM

[75] Inventors: Takahiro Onodera, Tokyo; Seiji Yamasuga, Hyogo, both of Japan

[73] Assignee: NEC Corporation, Tokyo, Japan

[21] Appl. No.: 980,705

[22] Filed: Nov. 24, 1992

[30] Foreign Application Priority Data

Dec. 28, 1991 [JP] Japan .................................. 3-358674

[51] Int. Cl.$^6$ .................................................. G06F 17/00
[52] U.S. Cl. ...................... 395/509; 395/511; 395/200.13
[58] Field of Search ................................. 395/200, 375, 395/425, 200.13, 509, 511

[56] References Cited

U.S. PATENT DOCUMENTS

| | | | |
|---|---|---|---|
| 4,609,917 | 9/1986 | Shen | 340/729 |
| 4,642,789 | 2/1987 | Lavelle | 395/250 |
| 4,679,038 | 7/1987 | Bantz et al. | 340/721 |
| 4,688,190 | 8/1987 | Bechtolsheim | 340/750 |
| 4,845,645 | 7/1989 | Matin et al. | 364/521 |
| 4,868,557 | 9/1989 | Perlman | 340/799 |
| 4,958,147 | 9/1990 | Kanema et al. | 340/706 |
| 5,134,697 | 7/1992 | Scheffler | 395/425 |
| 5,280,583 | 1/1994 | Nakayama et al. | 395/200 |
| 5,287,443 | 2/1994 | Mameda et al. | 395/146 |
| 5,297,043 | 3/1994 | Tuy et al. | 395/123 |
| 5,325,290 | 6/1994 | Cauffman et al. | 395/600 |
| 5,343,557 | 8/1994 | Kiel et al. | 395/118 |
| 5,404,452 | 4/1995 | Detschel et al. | 395/250 |

*Primary Examiner*—William M. Treat
*Assistant Examiner*—Zarni Maung
*Attorney, Agent, or Firm*—Foley & Lardner

[57] ABSTRACT

An object of the present invention is to provide a document data management system which can effect rapid screen display of document data. The document data management system comprises a communication processing apparatus for retrieving document data managed by another computer by way of a telecommunication line, a document data display apparatus for displaying on the screen document data requested by the user, a document data request processing apparatus for processing a document data retrieval request from the document data display apparatus, and a document data managing apparatus including document data writing controller which is utilized by the communication processing apparatus and document data reading controller which is utilized by the document data request processing apparatus. The document data display apparatus has an asynchronous read function by which a document read request to the document data request processing apparatus is carried out asynchronously of the operation of the communication processing apparatus.

5 Claims, 5 Drawing Sheets

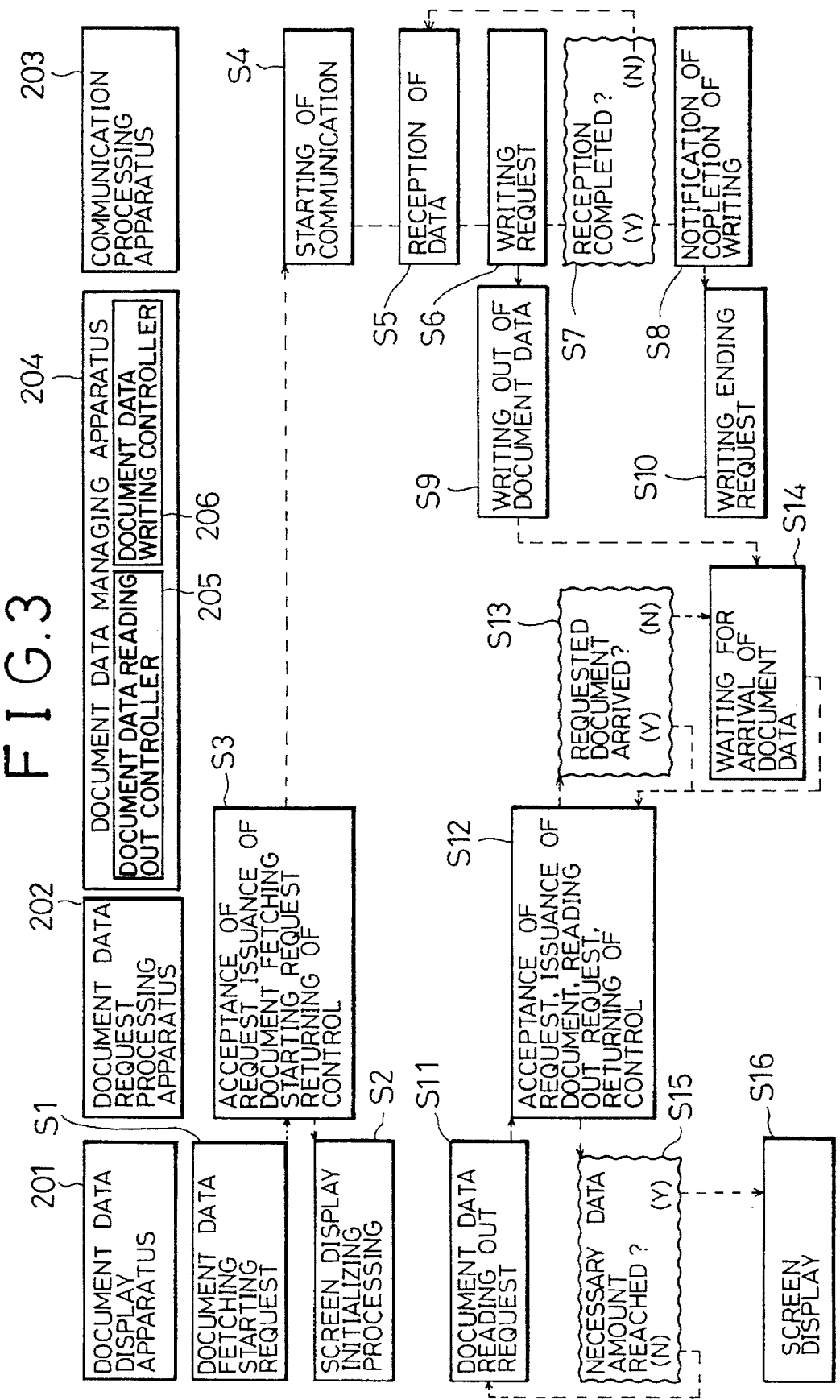

COMPUTER NETWORK HAVING AN ASYNCHRONOUS DOCUMENT DATA MANAGEMENT SYSTEM

FIELD OF THE INVENTION

This invention relates to a network system wherein a plurality of computers for individually managing document data are coupled by way of a telecommunication line, and more particularly to a document data management system having a function permitting a user of a particular computer to retrieve, making use of a telecommunication line, document data managed individually by other computers coupled to the particular computer by way of the telecommunication line and display the retrieved document data on the display screen of the particular computer.

DESCRIPTION OF THE RELATED ART

In a network system wherein a plurality of computers are coupled by way of a telecommunication line, it is a popular practice for a user of a particular computer to call up, making use of the telecommunication line, document data managed by other computers to the particular computer and display the document data on the display screen. The conventional configuration described below for the computers and the document data management system allows the transmission of document data between different computers.

FIG. 1 is a block diagram showing an outline of a computer which is employed in a conventional document data management system. Referring to FIG. 1, the computer shown includes document data display apparatus 101 which accepts input from the user of the computer, generates instructions in accordance with contents of the input, and displays document data read out by way of the network; communication processing apparatus 102 which effects communication by way of the network in accordance with the contents of the instructions from document data display apparatus 101; and document data file 103 read in by way of the telecommunication line.

When document data display apparatus 101 receives input from the user of the computer asking it to display document data managed by another computer, in order to supply the document data to be displayed to a storage apparatus (not shown) built into the document data display apparatus 101 itself, it issues a request to communication processing apparatus 102 to initiate retrieval of the document data and assigns its succeeding control to communication processing apparatus 102.

In this instance, the start request for document data retrieval issued from document data display apparatus 101 and sent to the communication processing apparatus 102 contains a document data number for clearly identifying the document to be displayed and a document data file name for supplying the document data to the storage apparatus.

The communication processing apparatus 102 effects communication with another computer that manages the object document data through the telecommunication line, in order to retrieve the document data managed by that computer, writes the retrieved document data with the document data file name designated by document data display apparatus 101 to the storage apparatus and produces the document data file 103.

After the communication processing apparatus 102 has written all of the document data instructed by the document data retrieval request into the storage apparatus, it returns control to the document data display apparatus 101.

Document data display apparatus 101, to which control has been returned, reads out the document data file 103 from the storage apparatus and effects display of the document data.

It is to be noted that when a document data read request from another computer is received by way of the telecommunication line, the document data display apparatus 101 having received the read request by way of the communication processing apparatus 102 effects confirmation as to whether or not the document data indicated by the read request is managed by the document data display apparatus 101 itself, and when the document data is managed by the document data display apparatus 101 itself, the document data display apparatus 101 sends the document data to the telecommunication line by way of the communication processing apparatus 102.

With the conventional system described above, document data cannot be displayed until after the communication processing apparatus 102 receives all of the document data and writes the document data into the document data file 103. Consequently, it has a drawback that handling a great amount of document data requires a long response time and excessive waiting time.

SUMMARY OF THE INVENTION

It is an object of the present invention to provide a document data management system which eliminates the disadvantage of the conventional document data management system and is capable of rapidly displaying document data on the screen.

According to the present invention, there is provided a computer which cooperates with other computers coupled to it by way of a telecommunication line to make up a network system, comprising:

document data display means for producing a document data retrieval request indicating a document data number and a document data file name which clearly identifies the document data requested for reading by the user of the computer, as well as for producing a document data read request indicating a buffer and a buffer size for retrieving the document data requested by the user and for displaying the read out document data on the screen thereof;

communication processing means for transmitting and receiving document data to and from another computer by way of the telecommunication line;

document data managing means including document data writing means and document data reading means for controlling a write operation and a read operation of a document data file, respectively; and document data request processing means for sending a document data retrieval request to the communication processing means when the document data retrieval request is received from the document data display means, and for reading the object document data using the document data reading means and delivering the read object document data to the document data display means when the document data read request is received;

the communication processing means effecting, when it is notified that the document data retrieval request has been received from the document data request processing means, processing the retrieval of the document data indicated by the document data retrieval request by way of the telecommunication line and writing the retrieved document data into the document data file using the document data writing means;

the document data display means effecting the document data reading request to the document data request processing means asynchronously from the operation of the communication processing means.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIG. 3 is a state transition diagram illustrating the operation of the computer shown in FIG. 2.

DETAILED DESCRIPTION OF THE PREFERRED EMBODIMENT

An embodiment of the present invention is described below with reference to FIGS. 2 and 3.

Figure 2:
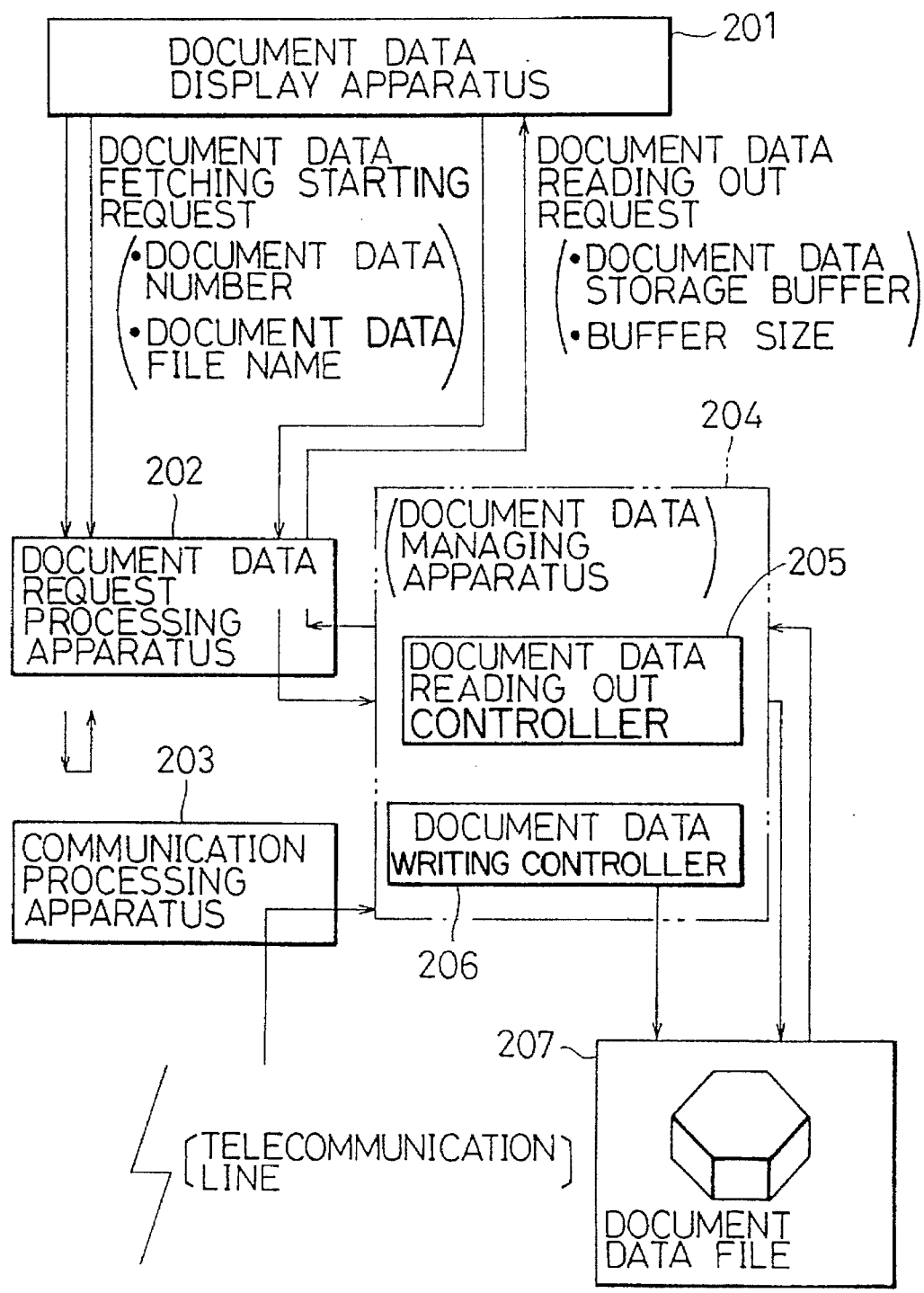
FIG. 2 is a block diagram showing the construction of a computer of an embodiment of the present invention.

FIG. 2 shows the construction of a computer employed in the present invention, and FIG. 3 is a state transition diagram illustrating operation of the computer of FIG. 2. The computer of the present embodiment includes a communication processing apparatus 203 for retrieving document data managed by another computer by way of a telecommunication line, a document data display apparatus 201 for producing a command to read document data requested by the user of the computer and displaying the read document data on the display screen, a document data request processing apparatus 202 for processing the document data retrieval request from the document data display apparatus 201, a document data managing apparatus 204 and a document data file 207 of the read document data.

The document data managing apparatus 204 is constituted from a document data writing controller 206 and document data reading controller 205 for controlling writing operation and reading operations of the document data file 207, respectively. The document data writing controller 206 is utilized by the communication processing apparatus 203 during writing, and the document data reading controller 205 is utilized by the document data request processing apparatus 202 during reading.

The document data display apparatus 201 included in the present embodiment has an asynchronous reading function to deliver a document data read request to the document data request processing apparatus 202 asynchronously from the operation of the communication processing apparatus 203.

Operation of the apparatus described above is described in detail with reference to FIG. 3.

The document data display apparatus 201 issues a document data retrieval start request to the document data request processing apparatus 202 (step S1) in order to retrieve document data to be displayed into a storage apparatus (not shown) thereof. In this instance, the document data retrieval start request issued by the document data display apparatus 201 contains a document data number for clearly identifying the document to be displayed and a document data file name for sending the document data to the storage apparatus. The document data request processing apparatus 202 sends the document data retrieval start request to the communication processing apparatus 203 and returns control to the document data display apparatus 201 (step S3). Having received the request, the communication processing apparatus 203 effects communication making use of the telecommunication line (step S4). When the document data managed by the object computer has been read from the object computer and received in the communication processing apparatus (step S5), a write request to write the read document data into the storage apparatus is issued (step S6) making use of document data writing controller 206 which is included in the document management apparatus 204. Upon reception of the write request at step S6, the document data writing controller 206 effects writing of the document data (step S9). After the issue of the write request at step S6, the communication processing apparatus 203 confirms whether or not all of the document data indicated by the document data retrieval start request from the document data request processing apparatus 202 has been received (step S7), and if the reception is not completed, the control sequence returns to step S5 so that the receiving operation of and the write request for the received document data are performed repetitively. On the other hand, if all of the document data have been received, the communication processing apparatus 203 issues a write end notification to the document data writing controller 206 (step S8). The document data writing controller 206 receives the write end notification and effects an end to the write process (step S10).

In this manner, in the present embodiment, document data file 207 is successively produced in response to a write request issued from the communication processing apparatus 203.

On the other hand, the document data display apparatus 201, which receives control with the notification of completion of the response to the document retrieval start request from the document data request processing apparatus 202 at step S3, begins screen display processing, including erasing of previously displayed data (step S2) in preparation for display of the document data, and then issues a document data read request to the document data request processing apparatus 202 to read the document data indicated by the document data retrieval start request issued to the document data request processing apparatus 202 asynchronously from the operation of the communication processing apparatus 203 at step S1 (step S11). The document data read request indicates a buffer for retrieving the document data and a buffer size.

Having received the document data read request, the document data request processing apparatus 202 again issues a document data read request to the document data reading controller 205 which is included in the document data managing apparatus 204.

Document data reading controller 205 confirms whether or not the document data indicated by the received document data read request has arrived and been written into the document data file 207 (step S13), and when the document data has arrived, document data reading controller 205 delivers the document data to the document data display apparatus 201 by way of the document data request processing apparatus 202. In this instance, if the document data of the requested amount has not arrived and not been written in the document data file 207, the delivery of the document data is performed after the document data of the requested amount has been written (step S14). The document data display apparatus 201 confirms whether or not the document data delivered to it has reached the amount necessary for display (step S15), and when the document data has reached the necessary amount, the document data display apparatus 201 effects display of an image based on the document data delivered to it (step S16). On the other hand, if the document data has not reached the necessary amount for display, the read request for the document data at step S11 is issued again.

Figure 1:
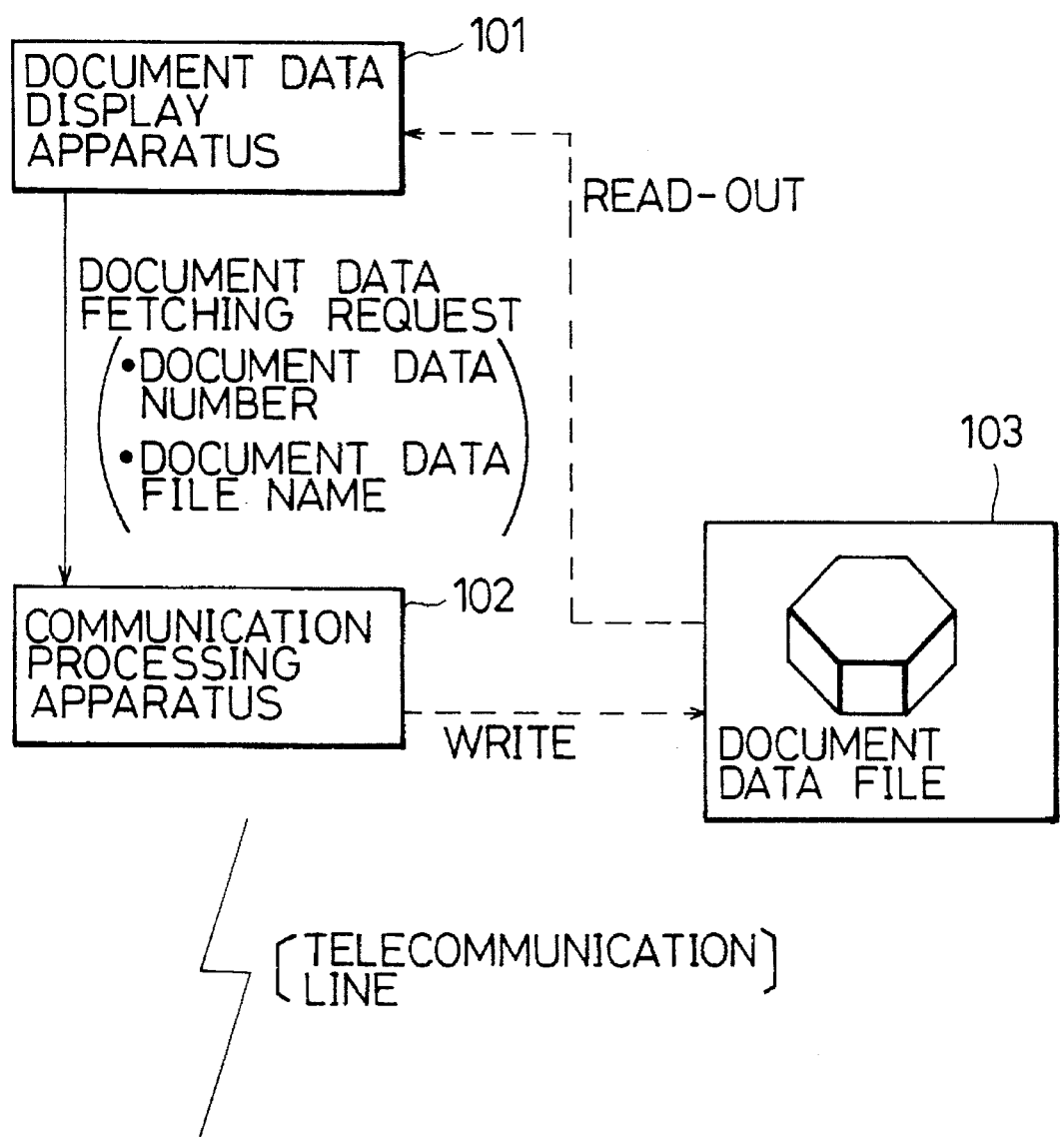
FIG. 1 is a block diagram showing the construction of a conventional computer.

It is to be noted that in both the present embodiment and in the prior art arrangement shown in FIG. 1, when a document data read request is received from another computer by way of the telecommunication line, the document data display apparatus 201, having received the read request by way of the communication processing apparatus 203, confirms whether or not the document data indicated by the request is managed by the document data display apparatus 201 itself, and if it is, sends the document data into the telecommunication line by way of the communication processing apparatus 203.

FIGS. 4a to 4f show several examples of configurations of a network system which employs the computer according to the present invention shown in FIG. 2.

Figure 4A:
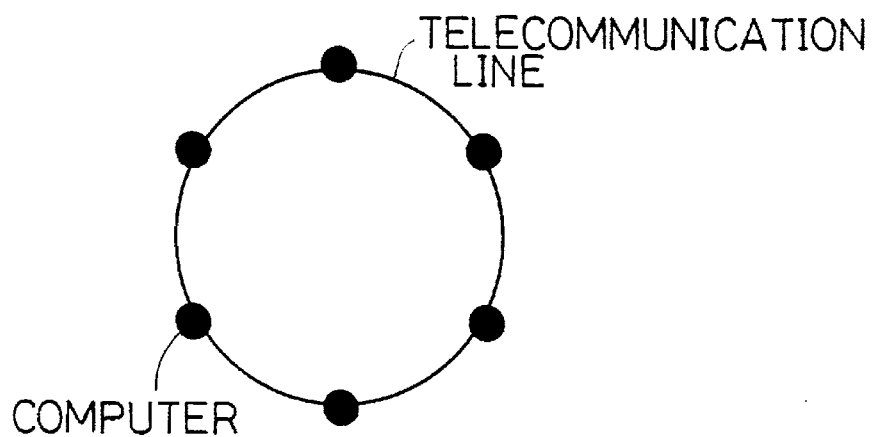
FIGS. 4a to 4f are diagrammatic views showing the configuration of computers and a network system to which a document data management system employing the computers is applied.
Figure 4B:
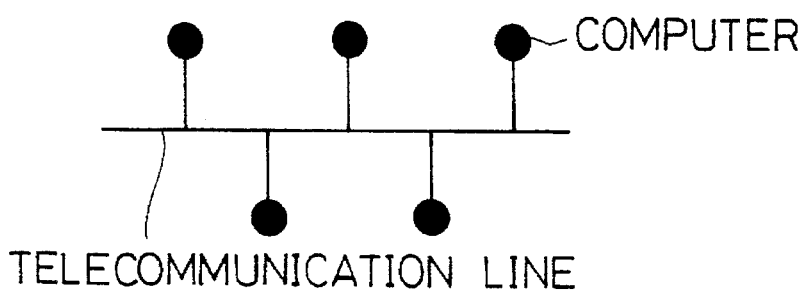

The computer according to the present invention and the document data managing system employing the computer can be applied to a network system of the loop type which effects communications according to the point-to-point system as shown in FIG. 4a as well as to a network system of the linear bus type which effects communications according to the broadcasting system shown in FIG. 4b.

Figure 4C:
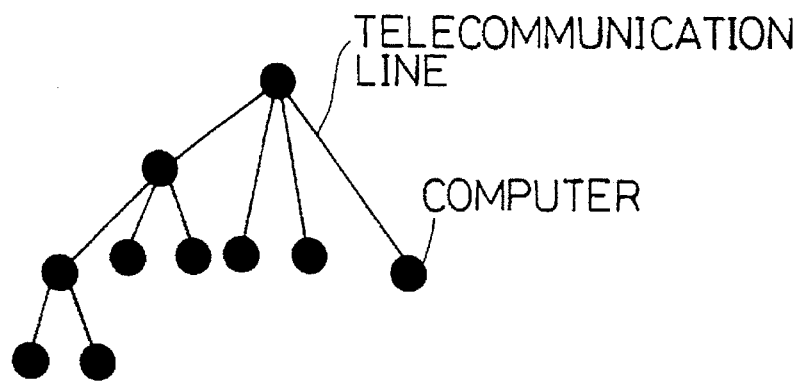
Figure 4D:
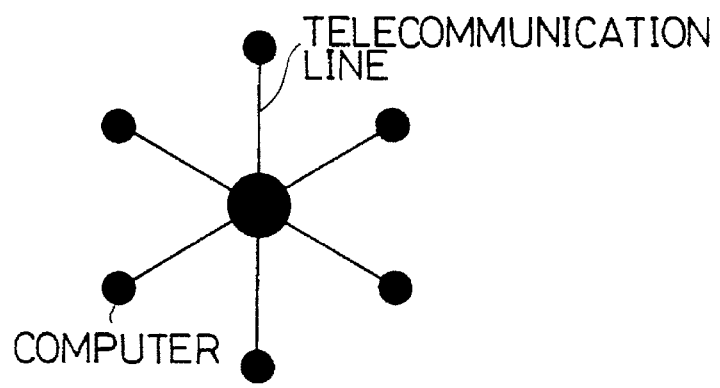
Figure 4E:
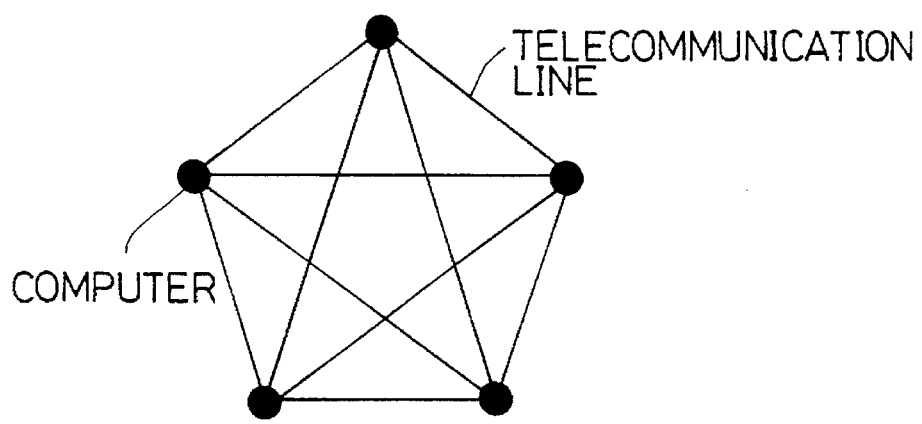
Figure 4F:
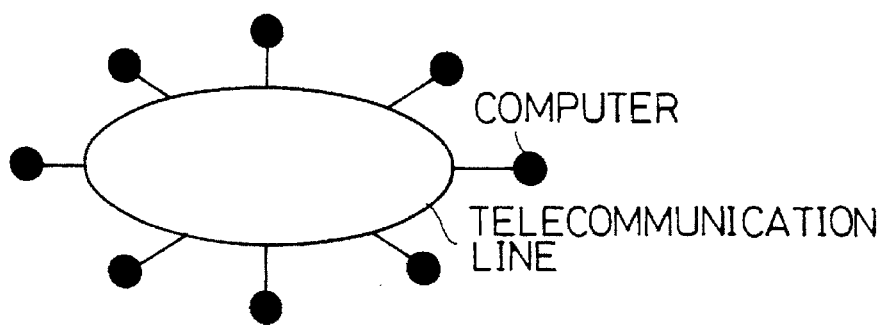

It is to be noted that the network systems which effect communications according to the point-to-point system include, in addition to those of the loop type described above, those of the tree type, the star type and the complete type shown in FIGS. 4c, 4d, and 4e, respectively, and the network systems which effect communications according to the broadcasting type include, in addition to those of the linear bus type, those of the ring path type shown in FIG. 4f. The computer and the document data management system employing the computer according to the present invention can be applied to a network system of any of these types.

As described so far, according to the present invention, since the communication processing apparatus and the screen display apparatus operate asynchronously, a novel and superior document data management system can be provided which achieves rapid screen display of document data without the need to wait for completion of communication of the entire document data.

Although variations in the embodiment described above are possible, the scope of the present invention is defined in the appended claims.

What is claimed is:

1. A computer in a computer network system, comprising:
an asynchronous document data display means for (a) producing, in response to a document data request issued by said computer, a document data retrieval request which identifies a document data number of said requested document data and a name of a local document data file into which said requested document data is to be stored, and a document data read request which identifies a buffer into which a portion of said requested document data is to be retrieved and a size of said buffer, and for (b) retrieving said portion of said requested document data into said buffer and displaying said portion of said requested document data on a screen of said computer, before all of said requested document data have been stored into said local document data file, wherein said portion of said requested document data is smaller in size than said requested document data;

communication processing means for transmitting and receiving document data to and from another computer of said computer network system through a telecommunication line;

document data managing means including document data writing means and document data reading means for controlling a write operation into and a read operation from said local document data file, respectively; and document data request processing means for sending said document data retrieval request to said communication processing means to process retrieval of said requested document data from said another computer and to write said requested document data into said local document data file using said document data writing means when said document data retrieval request is received from said document data display means, and for sending said document data read request to said document data managing means to read out said portion of said requested document data from said local document data file using said document data reading means and to deliver said portion of said requested document data to said document data display means when said document data read request is received from said document data display means.

2. A computer as claimed in claim 1, wherein said computer is coupled to other computers of said computer network system by way of said telecommunication line.

3. A computer as claimed in claim 2, wherein communication between said computers is achieved using a point-to-point system.

4. A computer as claimed in claim 2, wherein communication between the computers is achieved using a broadcasting system.

5. A computer network, comprising:
a plurality of computers; and
a telecommunication line connecting said computers to define said computer network,
wherein each of said plurality of computers includes,
an asynchronous document data display means for (a) producing, in response to a request for document data located in another computer, a document data retrieval request which identifies a document data number of said requested document data and a name of a local document data file into which said requested document data is to be stored, and a document data read request which identifies a buffer into which a portion of said requested document data is to be retrieved and a size of said buffer, and for (b) retrieving said portion of said requested document data into said buffer and displaying said portion of said requested document data on a screen of said computer, before all of said requested document data have been stored into said local document data file;

communication processing means for transmitting and receiving document data to and from said telecommunication line;

document data managing means including document data writing means and document data reading means for controlling a write operation into and a read operation from said local document data file, respectively; and document data request processing means for sending said document data retrieval request to said communication processing means to process retrieval of said requested document data from said another computer and to write said requested document data into said local document data file using said document data writing means when said document data retrieval request is received from said document data display means, and for sending said document data read request to said document data managing means to read out said portion of said requested document data from said local document data file using said document data reading means and to deliver said portion of said requested document data to said document data display means when said document data read request is received from said document data display means.

* * * * *